(12) United States Patent  
Fazzari et al.

(10) Patent No.: US 12,348,356 B2  
(45) Date of Patent: Jul. 1, 2025

(54) SCALABLE ELECTRIC POWER CONTROLS SYSTEM USING STATELESS SERVICES

(71) Applicant: Schweitzer Engineering Laboratories, Inc., Pullman, WA (US)

(72) Inventors: Bryan J. Fazzari, Meridian, ID (US); Brent L. DeSpain, Meridian, ID (US); Brittany D. Nall, Boise, ID (US); Mike Jones, Meridian, ID (US); Phillip N. Aasen, Edmonds, WA (US); Thomas J. Tardigrade, Kuna, ID (US); Joe Stanley, Potlatch, ID (US); Conner W. Maxey, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 332 days.

(21) Appl. No.: 18/153,611

(22) Filed: Jan. 12, 2023

(65) Prior Publication Data

US 2024/0243965 A1 Jul. 18, 2024

(51) Int. Cl.
*H04L 41/0659* (2022.01)
*H04L 41/0677* (2022.01)

(52) U.S. Cl.
CPC ...... *H04L 41/0661* (2023.05); *H04L 41/0659* (2013.01); *H04L 41/0677* (2013.01)

(58) Field of Classification Search
CPC ............. H04L 41/0661; H04L 41/0659; H04L 41/0677
USPC ........................................................ 370/216
See application file for complete search history.

(56) References Cited

U.S. PATENT DOCUMENTS

| | | | |
|---|---|---|---|
| 4,454,556 | A | 6/1984 | Depuy |
| 5,097,380 | A | 3/1992 | Moran |
| 5,237,511 | A | 8/1993 | Caird |
| 5,303,112 | A | 4/1994 | Zulaski |
| 5,373,411 | A | 12/1994 | Grass |
| 5,513,061 | A | 4/1996 | Gelbien |
| 5,629,825 | A | 5/1997 | Wallis |
| 5,896,302 | A | 4/1999 | Goodpaster |
| 5,973,899 | A | 10/1999 | Williams |

(Continued)

FOREIGN PATENT DOCUMENTS

| | | | | |
|---|---|---|---|---|
| CN | 114995355 B | * | 11/2024 | ......... G05B 23/0243 |
| WO | WO-2022165859 A1 | * | 8/2022 | ............. H02H 7/261 |
| WO | WO-2024183885 A1 | * | 9/2024 | ............. H04L 12/44 |

*Primary Examiner* — Melvin H Pollack
(74) *Attorney, Agent, or Firm* — Fletcher Yoder, P.C.

(57) ABSTRACT

Computational algorithms or "solvers" may be executed on intelligent electronic devices (IEDs) in an electric power delivery system to perform tasks such as locating and isolating electrical faults and restoring service to an area after an electrical fault occurs. However, executing the solvers may become a computationally prohibitive task, particularly where computing power is limited (e.g., low-power pole-top computers). In certain embodiments, computing power may be offloaded onto multi-instance networks that may enable processing of large amounts of complex data. It may be difficult for the multi-instance networks to obtain real-time or near real-time data from the electric power delivery system due to cybersecurity concerns. As such, multiple stateless services may be used to evaluate limited and/or obfuscated representations of a portion (e.g., a single feeder circuit) of the electric power delivery system.

20 Claims, 4 Drawing Sheets

(56) References Cited

U.S. PATENT DOCUMENTS

| | | | |
|---|---|---|---|
| 6,005,759 A | 12/1999 | Hart | |
| 6,008,971 A | 12/1999 | Duba | |
| 6,212,049 B1 | 4/2001 | Spencer | |
| 6,239,960 B1 | 5/2001 | Martin | |
| 6,341,054 B1 | 1/2002 | Walder | |
| 6,459,998 B1 | 10/2002 | Hoffman | |
| 6,549,880 B1 | 4/2003 | Willoughby | |
| 7,414,819 B2 | 8/2008 | Lee | |
| 7,714,735 B2 | 5/2010 | Rockwell | |
| 7,725,295 B2 | 5/2010 | Stoupis | |
| 8,067,946 B2 | 11/2011 | Muench | |
| 8,526,156 B2 | 9/2013 | Schweitzer | |
| 8,538,708 B2 * | 9/2013 | Yadav | H02J 13/00017 702/58 |
| 8,665,102 B2 | 3/2014 | Salewske | |
| 8,674,843 B2 * | 3/2014 | Bhageria | H02J 13/00017 700/286 |
| 9,052,731 B2 * | 6/2015 | Smit | G05F 1/66 |
| 9,257,833 B2 | 2/2016 | Allen | |
| 9,450,454 B2 * | 9/2016 | Taft | H02J 13/00034 |
| 9,537,720 B1 * | 1/2017 | Baggott | G06F 9/45558 |
| 9,794,658 B2 * | 10/2017 | Viswanadham | H04L 41/0661 |
| 10,091,052 B1 * | 10/2018 | Corrigan | H04L 43/10 |
| 10,560,212 B2 * | 2/2020 | Al Sayeed | H04J 14/021 |
| 11,199,837 B2 * | 12/2021 | Cella | H04L 67/1097 |
| 11,680,977 B2 * | 6/2023 | Sun | G01R 31/085 706/15 |
| 11,774,944 B2 * | 10/2023 | Cella | G06N 20/00 700/275 |
| 11,782,470 B2 * | 10/2023 | Forbes, Jr. | H02J 13/00001 700/286 |
| 11,852,692 B1 * | 12/2023 | Stuart | H03K 19/20 |
| 11,888,701 B1 * | 1/2024 | Liu | H04L 41/12 |
| 11,921,170 B2 * | 3/2024 | Davarpanah | G01R 31/52 |
| 11,954,409 B2 * | 4/2024 | Wu | G06Q 10/06313 |
| 12,010,550 B2 * | 6/2024 | Kostic | H04L 47/76 |
| 12,014,065 B2 * | 6/2024 | Whitlock | G06F 3/0631 |
| 12,057,692 B2 * | 8/2024 | Eriksen | H02H 7/226 |
| 12,062,910 B2 * | 8/2024 | Holcombe | H02J 3/16 |
| 12,066,900 B2 * | 8/2024 | Schultz | G06F 11/2094 |
| 12,068,602 B2 * | 8/2024 | Ratnayake | G05B 19/042 |
| 12,124,978 B2 * | 10/2024 | Wu | H02J 3/001 |
| 12,141,007 B2 * | 11/2024 | McNutt | G06F 1/26 |
| 12,160,098 B2 * | 12/2024 | Carlson | H01H 73/045 |
| 12,176,163 B2 * | 12/2024 | Batra | H01H 33/596 |
| 12,204,543 B2 * | 1/2025 | Cella | B25J 11/00 |
| 2006/0039094 A1 | 2/2006 | Brucker | |
| 2010/0036538 A1 | 2/2010 | Stergiou | |
| 2013/0163132 A1 | 6/2013 | Schweitzer | |
| 2014/0277804 A1 | 9/2014 | Witte | |
| 2019/0207805 A1 * | 7/2019 | Kakani | H04L 41/12 |
| 2021/0263511 A1 * | 8/2021 | Singh | G05B 23/0227 |
| 2021/0376656 A1 * | 12/2021 | Forbes, Jr. | H02J 13/00006 |
| 2022/0329099 A1 * | 10/2022 | Mohan | G06F 3/0484 |
| 2023/0131038 A1 * | 4/2023 | Koizumi | H02J 3/381 700/286 |
| 2023/0160941 A1 * | 5/2023 | Sloop | H02J 13/00022 324/512 |
| 2023/0176557 A1 * | 6/2023 | Cella | G05B 23/024 700/117 |
| 2023/0283063 A1 * | 9/2023 | Smith | H02H 3/08 361/93.1 |
| 2023/0305876 A1 * | 9/2023 | Sharma | G06F 11/0793 |
| 2024/0006868 A1 * | 1/2024 | Valtari | H02H 1/0092 |
| 2024/0088676 A1 * | 3/2024 | Sun | H02J 3/466 |
| 2024/0106224 A1 * | 3/2024 | Kannan | H01H 33/52 |
| 2024/0204517 A1 * | 6/2024 | Khan | H02J 3/0073 |

* cited by examiner

SCALABLE ELECTRIC POWER CONTROLS SYSTEM USING STATELESS SERVICES

BACKGROUND

This disclosure relates to electric power delivery systems. More particularly, this disclosure relates to control and operation of electric power delivery systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery systems carry electricity from a transmission system to residential communities, factories, industrial areas, and other electricity consumers. The electric power delivery systems may include intelligent electronic devices (IEDs) that may enable and facilitate control operations within the power delivery or distribution systems. Computational algorithms or "solvers" may be executed on the IEDs to perform tasks such as locating and isolating electrical faults and restoring service to an area after an electrical fault occurs.

However, executing the computational algorithms may become a computationally prohibitive task, particularly where computing power is limited (e.g., low-power pole-top computers). As such, in some cases, computing power may be offloaded onto multi-instance and/or cloud-based or cluster-based networks that may enable processing of large amounts of complex data. Yet it may be difficult for the multi-instance and/or cloud-based or cluster-based networks to obtain real-time or near real-time data from the electric power delivery system due to cybersecurity concerns. Additionally, requiring distributed intelligence to maintain synchronized knowledge of the state of an electric power system may increase complexity, may increase the risk of misoperation, and may reduce resiliency in the event of solver and/or service failure or recovery.

DETAILED DESCRIPTION

Figure 1:
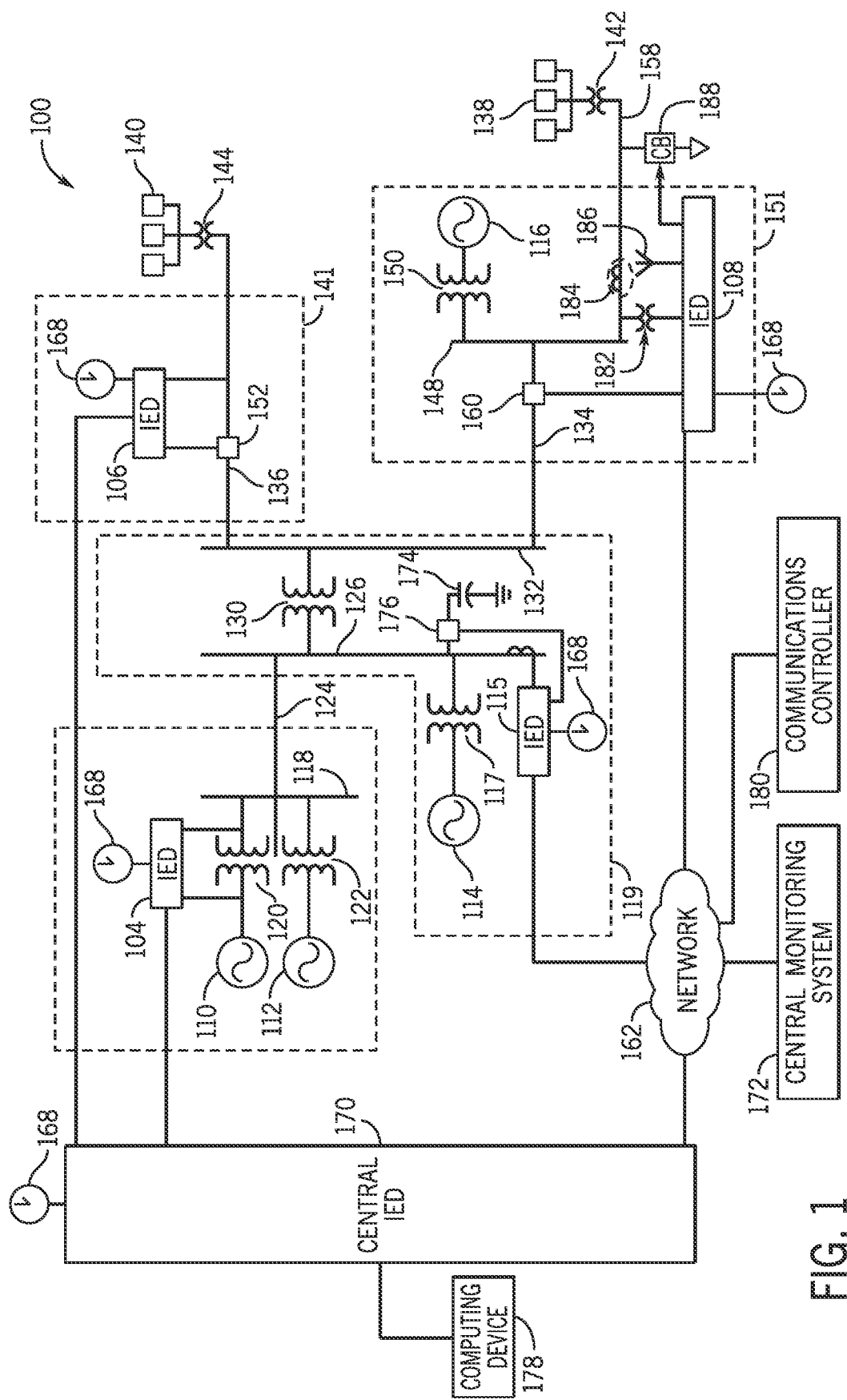
FIG. 1 is a schematic diagram of an embodiment of an electric power delivery system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

Computational algorithms may be executed on a variety of devices across an electric power delivery system. These computational algorithms, or "solvers," may perform tasks such as voltage optimization, electrical fault location, electrical fault isolation, electric power restoration, control sequencing, and so on. In some embodiments, the solvers may be tasked with processing and computing data received from a centralized, monolithic model of an entire electric power delivery system, which may involve the solver operating on excessively large quantities of data. As such, executing certain solvers to perform a task in an electric power delivery system may involve the evaluation of numerous probabilities and outcomes. This may become a computationally prohibitive task, especially when computer power is limited (e.g., for low-power pole-top computers or substation-based computers with limited environmental control, such as cooling).

To address the issue of insufficient computing power, in some embodiments, the solvers may be executed on a cluster or collection of computers that enable large quantities of computer power to operate in parallel. It may be difficult to receive real-time or near real-time data from the electric power delivery system for processing and evaluation by a multi-instance and/or cloud or cluster-based solver due to cybersecurity concerns. However, using stateless services to evaluate limited or obfuscated representations of only a portion of the electric power delivery system (e.g., a single feeder circuit) may enable distribution of a computing load across multiple devices, enhancing security by making it more difficult to obtain actionable data in the event such a service becomes compromised. For instance, the data provided to the stateless services may be significantly limited in scope, and may be removed from the context of the electric power supply system such that the data has reduced or minimized use outside of the context of the data from numerous associated services in the electric power supply system.

The services may be compartmentalized or containerized and capable of receiving information about a connective topology of a portion of an electric power delivery system. Information about the connective topology may be accompanied by data collected from the electric power delivery system, and the services may return a result based on the connective topology (e.g., a location of a fault or switching sequence to reroute electricity and restore customer power). The services may be designed to be stateless (e.g., retain no memory of the data or the computation performed once a result has been returned) and limited in functional scope, the services may not have any sensitive data pertaining to the electric power delivery system, and the service's access to the power system data and information may be strictly controlled (e.g., the services may only be able to receive connectivity information and specific data to evaluate and may be unable to retrieve data or issue any kind of control). Moreover, the services may not be aware that they are performing operations pertaining to the electric power delivery system at all.

The services may simply receive a dataset that describes an interconnected web of objects and be tasked with locating something or performing a specific search or optimization task on the dataset. A result returned by the services may be an answer to a limited scope task, which may only be understood and used by a recipient (e.g., one or more devices on the feeder circuit). Moreover, as was previously mentioned, the services may be stateless, and thus retain no memory of the obfuscated data upon which the services have operated once the services return the requested result.

With the preceding in mind, FIG. 1 is a schematic diagram of an electric power delivery system 100 that may generate, transmit, and/or distribute electric energy to various loads (e.g., different structures). The electric power delivery system 100 may use various intelligent electronic devices (IEDs) 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor bank (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117

(e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A central IED 170 (e.g., a switch) may be in communication with the IEDs 104, 106, 108, 115. The IEDs 104, 106, 108, 115 may be remote from the central IED 170 and may communicate over various media. For instance, the central IED 170 may be directly in communication with the IEDs 104, 106 and may be in communication with the IEDs 108, 115 via the communications network 162.

The central IED 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the central IED 170. The central IED 170 may receive the data and may subsequently transmit the data to an intended recipient of the data. The central IED 170 may also control data flow between one of the IEDs 104, 106, 108, 115 and another device communicatively coupled to the central IED 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the central IED 170 and/or to send data, such as a user input, to the electric power delivery system 100 via the central IED 170. Thus, the central IED 170 may enable or block operation of the electric power delivery system 100 via the computing device 178.

A communications controller 180 may interface with equipment in the communications network 162 to create a software-defined network that facilitates communication between the central IED 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the central IED 170 to instruct the central IED 170 to transmit certain data (e.g., data associated with a certain set of characteristics or information) to a particular destination (e.g., an intended recipient) using flows, matches, and actions defined by the communications controller 180.

Figure 2:
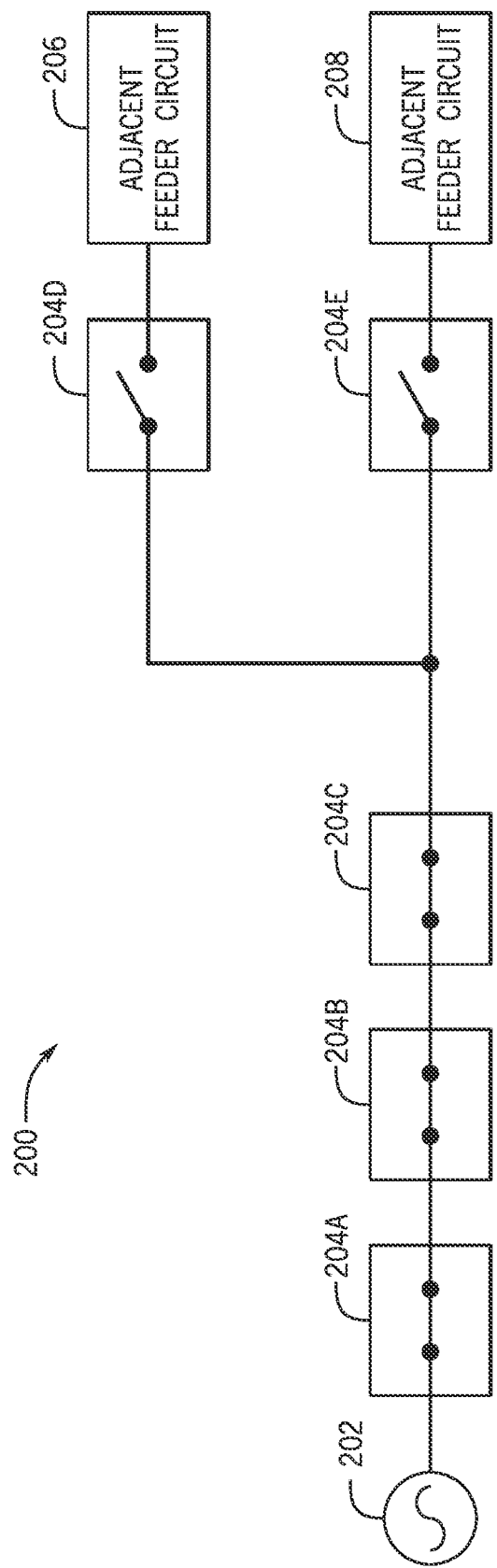
FIG. 2 is a schematic diagram of a feeder circuit of the electric power delivery system of FIG. 1, in accordance with an aspect of the present disclosure.

FIG. 2 is a schematic diagram of a feeder circuit 200 that may include a portion of the electric power delivery system 100. The feeder circuit may include an electric generator 202. The electric generator 202 may include a dam, a coal-powered electric generator, a nuclear power plant, a distributed electric generator, such as a solar farm or wind turbine farm, and so on. The feeder may include one or more field devices 204A, 204B, 204C, 204D, and 204E (referred to herein as the field devices 204). The field devices 204 may include the IEDs 104, 106, 108, and 115.

The field devices 204 may communicate with each other as well as other field devices (e.g., the IEDs 104, 106, 108, and 115) on adjacent feeder circuits 206 and 208 of the electric power delivery system 100. Each field device 204 may send information to and receive information from other field devices 204, such as the amount of power being supplied by the electric generator 202, how many field devices 204 are on a particular feeder circuit, where power in the circuit is flowing to and from, to which field device(s) is power flowing, information regarding one or more electrical loads on the feeder circuit 200, a state of one or more of the field devices 204 coupled to the feeder circuit 200 (e.g., indicating whether the field devices 204 are operating as an open or closed switch), and so on. As will be discussed in greater detail in FIG. 3 below, such information may be sensitive information, thus it may be undesirable for the information to be shared outside of the electric power delivery system 100 or the feeder circuit 200.

As previously discussed, solvers may be executed on a variety of devices (e.g., the field devices 204) across the electric power delivery system 100. The solvers executed on the field devices 204 may perform tasks such as detecting and isolating an electrical fault on the feeder circuit 200, restoring power to the feeder circuit 200 or a portion thereof, control sequencing, and so on. In some embodiments, the solvers may be tasked with processing and computing data received from a centralized, monolithic model of the entire electric power delivery system 100, which may involve the solver operating on excessively large quantities of data. As such, executing certain solvers to perform a task in the electric power delivery system 100 may involve the evaluation of multitudinous probabilities. This may become a computationally prohibitive task for certain computers used in the electric power deliver system 100, such as a low-power pole-top field device that will be described in FIG. 3 below.

Figure 3:
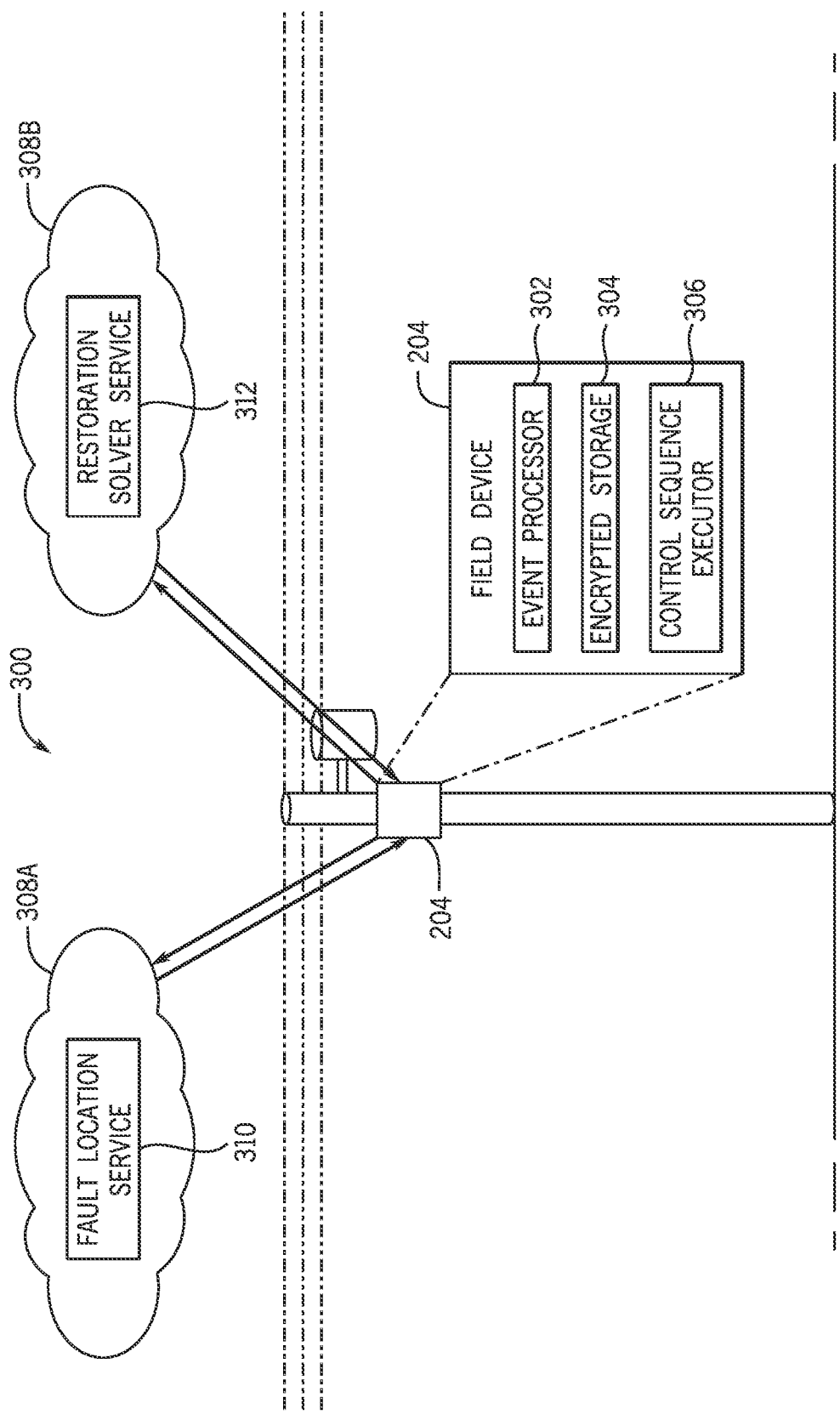
FIG. 3 is an illustration of a portion of the feeder circuit of FIG. 2 including a field device that may execute applications used in the electric power delivery system of FIG. 1 by communicating with one or more networks, in accordance with an aspect of the present disclosure.

FIG. 3 is an illustration of a portion of an electric power distribution system 300 including a field device (e.g., any of the field devices 204A, 204B, 204C, 204D, or 204E) that may execute applications used in the electric power delivery system 100 (e.g., a fault location, isolation, and service restoration (FLISR) application) by communicating with one or more networks. In some embodiments, the field device 204 may be responsible for executing various processes or algorithms, such as executing fault location algorithms, fault isolation algorithms, restoration solver algorithms, and so on. However, the field device 204 may be a relatively low-power machine, making it difficult or impossible to properly execute such algorithms in a scalable manner.

To address the issue of insufficient computing power, in some embodiments, one or more services (e.g., a fault location service 310 and/or a restoration solver service 312) may be exported to a multi-instance and/or cloud or cluster-based platform via networks 308A and 308B. The fault location service 310 and the restoration solver service 312 may be compartmentalized or containerized and capable of receiving information about a connective topology of a portion of the electric power delivery system 100 (e.g., the feeder circuit 200). Information about the connective topology may be accompanied by data collected from the field devices 204 of the electric power delivery system 100, and the services may return one or more results based on the connective topology (e.g., a location of a fault or switching sequence to reroute electricity and restore customer power). While only the fault location service 310 and the restoration solver service 312 are shown on the networks 308A and 308B, there may be any number of services operating on the networks 308A and 308B according to the tasks desired to be run on the feeder circuit 200 or the electric power delivery system 100. For example, there may be a voltage optimization service running on a multi-instance and/or cloud-based platform on the network 308A and/or 308B.

As will be discussed in greater detail below, the services may be designed to be stateless (i.e., retain no memory of the data or the computation performed once a result has been returned) and limited in functional scope, the services may not have any sensitive data pertaining to the electric power delivery system, and the service's access to the power system data and information may be strictly controlled (e.g., the services may only be able to receive connectivity information and specific data to evaluate and may be unable to retrieve data or issue any kind of control).

Moreover, the services may not be aware that they are performing operations pertaining to the electric power delivery system 100. The services may simply receive a dataset that describes an interconnected web of objects and be tasked with locating something or performing a specific search or optimization task on the dataset. A result returned by the services may be an answer to a limited scope task, which may only be understood and used by a recipient (e.g., one or more devices on the feeder circuit). Moreover, as was previously mentioned, the services may be stateless, and thus retain no memory of the obfuscated data upon which the services have operated once the services return the requested result.

As some information shared by the field device 204 (e.g., as mentioned in the discussion of the feeder circuit 200 in FIG. 2) may be sensitive, it may be desirable for the field device 204 to retain certain devices (e.g., an event processor 302, an encrypted storage 304, and a control sequence executor 306) and perform certain tasks that may include, use or that may be otherwise associated with sensitive information regarding the electric power delivery system 100. The field device 204 may only send and receive certain information to and from the networks 308A and/or 308B that is narrow in scope, decontextualized, or otherwise obfuscated to effectuate locating and isolating electrical faults and restoring power to customers in an efficient or optimized manner, as will be discussed in greater detail with reference to FIG. 4 below.

Figure 4:
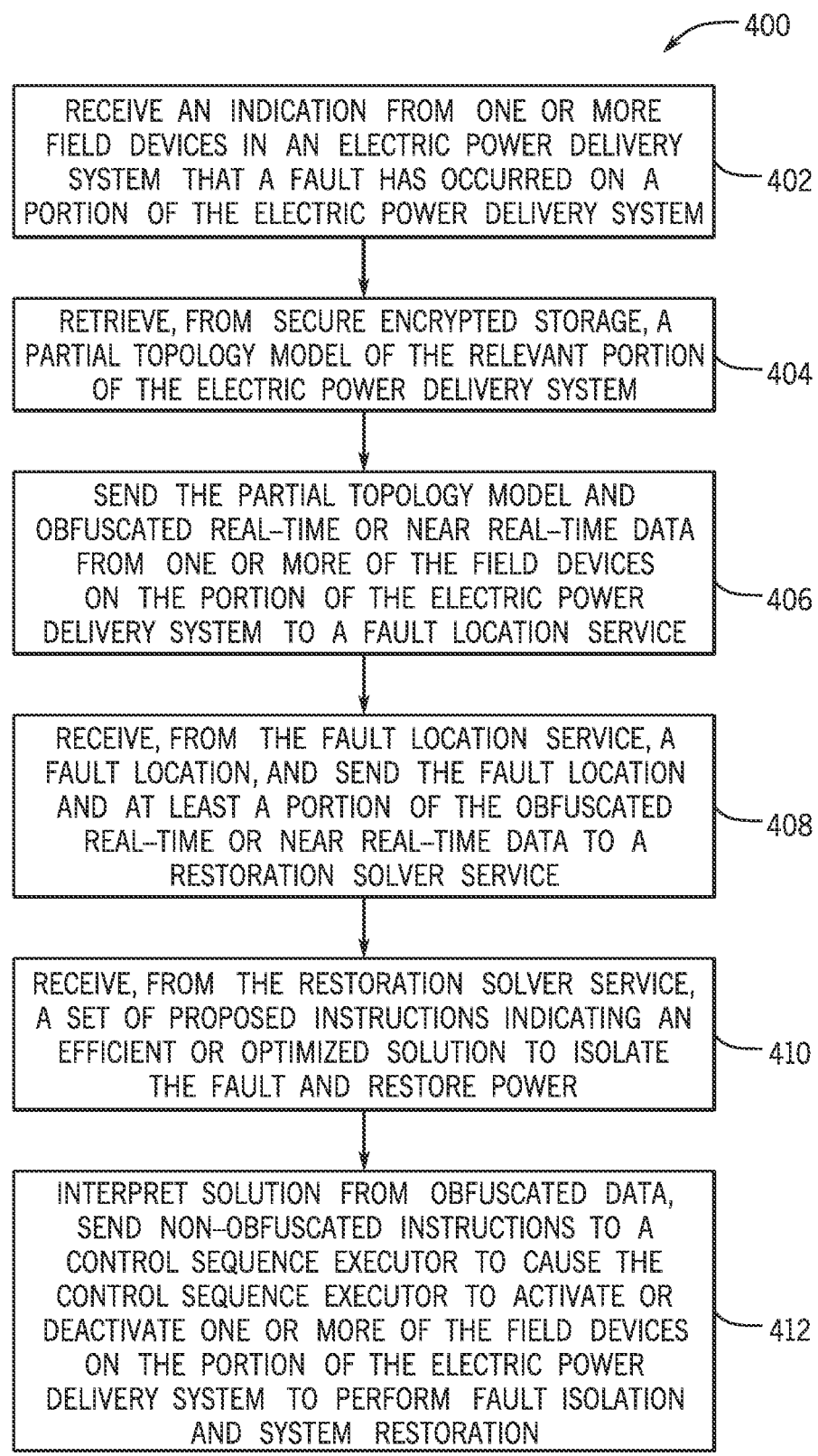
FIG. 4 is a flowchart of a method for performing fault location, isolation, and service restoration between a field device and one or more services executed on one or more networks, in accordance with an aspect of the present disclosure.

FIG. 4 is a flowchart of a method 400 for performing fault location, isolation, and service restoration between a field device (e.g., 204) and one or more services (e.g., 310 and 312) executed on one or more networks (e.g., 308A and 308B). The method 400 may be performed by a processor of the field device 204 (e.g., the event processor 302). In process block 402, the event processor 302 may receive an indication from the field device 204 or other field devices (e.g., 204A, 204B, 204C, 204D, and/or 204E) on the electric power delivery system 100 that a fault has occurred on a portion of the electric power deliver system 100 (e.g., the feeder circuit 200).

In process block 404, the event processor 302 may retrieve, from the secure encrypted storage 304 (e.g., including one or more memory devices), a partial topology model of the portion of the electric power delivery system 100 that is experiencing the fault. For example, if the feeder circuit 200 experiences a fault, the event processor 302 may retrieve a partial topology model of the feeder circuit 200 that includes only general connectivity information illustrating various points (e.g., which may represent various field devices 204) connected by various lines (e.g., which may represent various power lines or busses connecting the field devices 204), while obfuscating what the points and lines are, where in the electric power delivery system 100 the partial topology model is, or even that the partial topology model represents a portion of the electric power delivery system 100.

In process block 406, the event processor 302 may send the partial topology model and certain obfuscated real-time or near real-time data from one or more of the field devices 204 on the portion of the electric power delivery system 100 (e.g., the feeder circuit 200) to the fault location service 310 on the network 308A. It may, in some instances, be difficult to send or receive real-time or near real-time data from the electric power delivery system 100 for processing and evaluation by cloud-based services due to cybersecurity concerns. However, such concerns may be addressed by using stateless services to evaluate the limited or obfuscated data (e.g., the partial topology model, static metadata pertaining to the partial topology model, and so on). By making services implemented on the networks 308A and 308B (e.g., the fault location service 310, the restoration solver service 312, a voltage optimization service) stateless, the services implemented on the networks 308A and 308B may retain no memory of the data sent to it by the field device 204 after returning the requested results requested.

For example, after the fault location service 310 returns a fault location (or fails to return a fault location), the fault location service 310 may not retain certain data (e.g., the partial topology model, other metadata pertaining to the partial topology model, and so on) and obfuscated data from the field device 204. In addition to implementing the stateless services, using data that is partial, narrow in scope, and/or obfuscated may enable distribution of the computing load across multiple devices (e.g., devices connected via the networks 308A and/or 308B) while enhancing network security by making it more difficult to obtain actionable data in the event such a service becomes compromised.

In process block 408, the event processor 302 may receive a fault location from the fault location service 310. The event processor 302 may send the partial topology model including the fault location and at least a portion of the obfuscated real-time or near real-time data to the restoration solver service 312 in the network 308B. The restoration solver service 312 may determine an efficient or optimized solution to isolate the fault and restore power to the affected area.

In process block 410, the event processor 302 may receive, from the restoration solver service, a set of proposed instructions indicating the efficient or optimized solution to isolate the fault and restore power to the affected area. Such a solution may involve electrically isolating certain areas (e.g., by instructing certain field devices 204 to open one or more switches) and, if necessary, rerouting power from the adjacent feeder circuits 206 and/or 208 (e.g., by instructing the field devices 204D and/or 204E to close one or more switches).

In process block 412, the event processor 302 may interpret the solution received from the restoration solver service 312 (e.g., by mapping the partial topology model to the feeder circuit 200) and send non-obfuscated data and instructions to the control sequence executor 306, causing the control sequence executor to activate or deactivate one or more of the field devices 204 on the feeder circuit to isolate the fault and restore at least a portion of the power to the feeder circuit 200. In this way, the present disclosure enables more robust computation in a system with limited computing power while maintaining security throughout the electric power delivery system 100.

While specific embodiments and applications of the disclosure have been illustrated and described, it is to be noted that the disclosure is not limited to the precise configurations and devices disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A method, comprising:
   receiving, at an event processor, an indication of an electrical fault on a feeder circuit of an electric power delivery system;
   in response to receiving the indication of the electrical fault, retrieving, from secure encrypted storage, obfuscated data pertaining to the feeder circuit;
   sending the obfuscated data to a fault location service executing on a first platform;
   receiving, from the fault location service, an identified fault location;
   sending the identified fault location and at least a portion of the obfuscated data to a restoration solver service executing on a second platform;
   receiving, from the restoration solver service, instructions for isolating the electrical fault and restoring power to the feeder circuit;
   interpreting the instructions received from the restoration solver service; and
   sending the instructions to a control sequence executor to cause the control sequence executor to perform fault isolation and service restoration.

2. The method of claim 1, wherein the fault location service, the restoration solver service, or both comprise stateless solvers.

3. The method of claim 1, wherein the obfuscated data comprises a partial topology model of the feeder circuit, metadata pertaining to the partial topology model, or both.

4. The method of claim 3, wherein interpreting the instructions received from the restoration solver service comprises mapping the partial topology model to the feeder circuit.

5. The method of claim 1, wherein receiving, at the event processor, the indication of the electrical fault on the feeder circuit comprises receiving data pertaining to electric power flow in the feeder circuit, electric load demand on the feeder circuit, a state of a plurality of field devices coupled to the feeder circuit, or any combination thereof.

6. The method of claim 1, wherein the instructions for isolating the electrical fault and restoring power to the feeder circuit comprise instructions for:
   causing a first set of switches to be opened to de-energize a first portion of the feeder circuit; and
   causing a second set of switches to be closed to couple the feeder circuit to one or more adjacent feeder circuits.

7. A system comprising:
   a first remote computing device;
   a second remote computing device; and
   a first field device configured to communicatively couple to the first remote computing device, the second remote computing device, or both, and configured to electrically couple to a feeder circuit, the first field device comprising:
      event processing circuitry configured to:
         receive data pertaining to the feeder circuit;
         obfuscate the data; and
         send the obfuscated data to and receive returned results from the first remote computing device, the second remote computing device, or both;
      encrypted storage; and
      a control sequence executor.

8. The system of claim 7, wherein the first remote computing device is configured to host a fault location service.

9. The system of claim 7, wherein the first remote computing device is configured to host a restoration solver service.

10. The system of claim 7, wherein the data pertaining to the feeder circuit comprises an indication of an electrical fault on the feeder circuit.

11. The system of claim 10, wherein the event processing circuitry is configured to, in response to receiving the indication of the electrical fault on the feeder circuit, retrieve a partial topology model from the encrypted storage.

12. The system of claim 11, wherein the event processing circuitry is configured to send the partial topology model and the obfuscated data to the first remote computing device and receive, in response to sending the partial topology model and the obfuscated data to the first remote computing device, a location of the electrical fault on the feeder circuit.

13. The system of claim 12, wherein the event processing circuitry is configured to:
in response to receiving the location of the electrical fault on the feeder circuit, send the location of the electrical fault and at least a portion of the obfuscated data to the second remote computing device; and
in response to sending to the location of the electrical fault and at least a portion of the obfuscated data to the second remote computing device, receive a set of proposed instructions indicating a solution to isolate the electrical fault and restore power to the feeder circuit.

14. The system of claim 13, wherein the event processing circuitry is configured to send the proposed instructions to the control sequence executor.

15. The system of claim 14, wherein the control sequence executor is configured to open a first plurality of switches in the feeder circuit to electrically isolate an area affected by the electrical fault.

16. The system of claim 15, wherein the control sequence executor is configured to close a second plurality of switches between the feeder circuit and an additional feeder circuit to restore power to at least a portion of the feeder circuit.

17. A non-transitory computer-readable medium comprising instructions, wherein the instructions, when executed by processing circuitry, are configured to cause the processing circuitry to:
receive, at an event processor, an indication of an electrical fault on a feeder circuit of an electric power delivery system;
in response to receiving the indication of the electrical fault, retrieve, from an encrypted storage medium, obfuscated data pertaining to the feeder circuit;
send the obfuscated data to a fault location service executing on a platform;
receive, from the fault location service, an identified fault location;
send the identified fault location and at least a portion of the obfuscated data to a restoration solver service executing on the platform;
interpret the instructions received from the restoration solver service; and
send the instructions to a control sequence executor to cause the control sequence executor to perform fault isolation and service restoration on the feeder circuit.

18. The non-transitory computer-readable medium of claim 17, wherein the obfuscated data comprises, at least in part, a partial topology model of the feeder circuit.

19. The non-transitory computer-readable medium of claim 17, wherein the instructions for isolating the electrical fault and restoring power to the feeder circuit cause the processing circuitry to:
cause a first set of switches to open to de-energize a first portion of the feeder circuit; and
cause a second set of switches to be closed to couple the feeder circuit to one or more adjacent feeder circuits.

20. The non-transitory computer-readable medium of claim 17, wherein the fault location service, the restoration solver service, or both comprise stateless solvers.

\* \* \* \* \*